Patented Oct. 27, 1925.

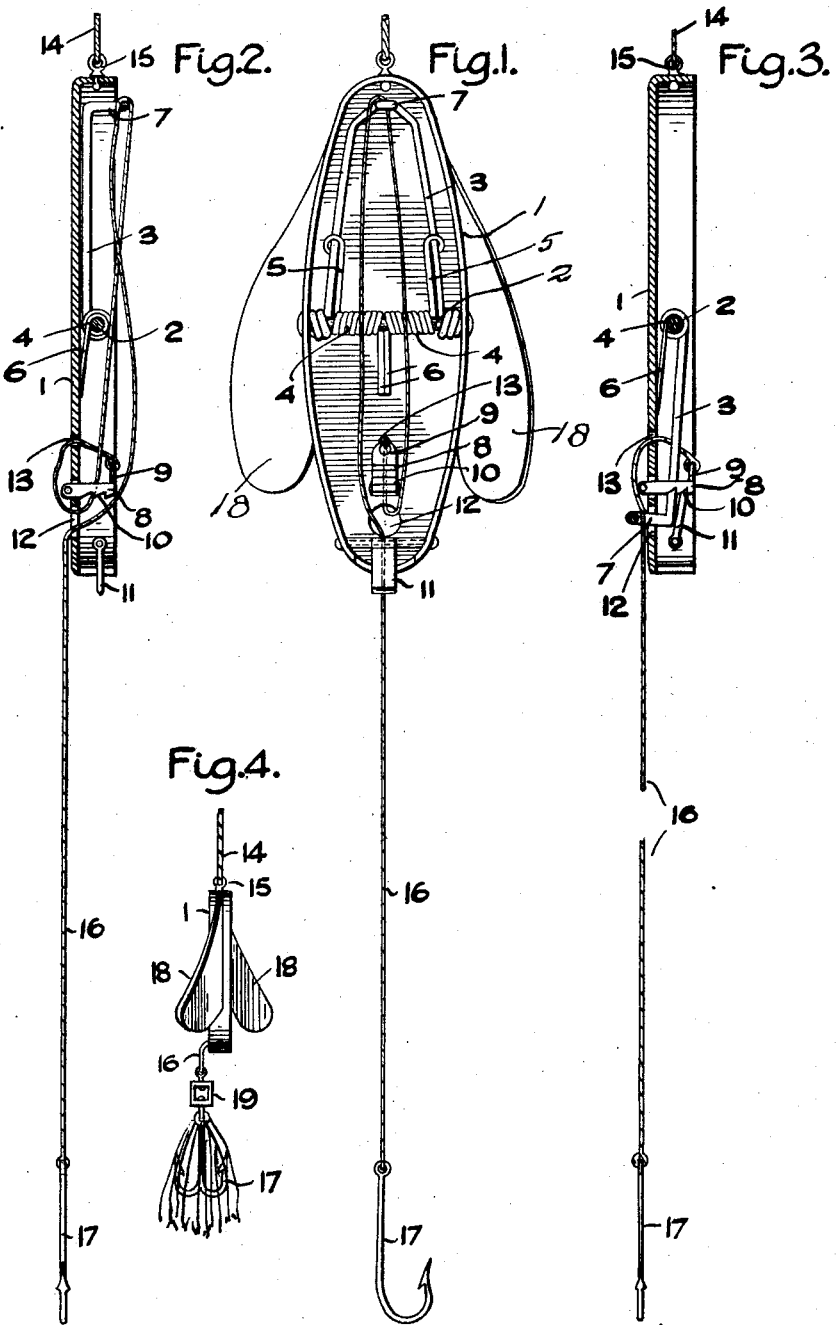

1,558,916

UNITED STATES PATENT OFFICE.

JOHN GEORGE PENNELL, OF TORONTO, ONTARIO, CANADA, ASSIGNOR TO GEORGE KERSHAW, OF TORONTO, CANADA.

DEVICE FOR AUTOMATICALLY HOOKING FISH.

Application filed May 5, 1921, Serial No. 466,877. Renewed September 10, 1925.

*To all whom it may concern:*

Be it known that I, JOHN GEORGE PENNELL, a resident of the city of Toronto, in the county of York, in the Province of Ontario, Canada, have invented certain new and useful Improvements in Devices for Automatically Hooking Fish, of which the following is the specification.

My invention relates to improvements in devices for automatically hooking fish and the object of the invention is to construct a device in which the fish will be automatically hooked upon its taking the hook into its mouth.

My invention consists of a device constructed and arranged substantially as hereinafter more particularly described and illustrated in the accompanying drawing in which:

Fig. 1 is an elevational view of the device.

Fig. 2 is a vertical cross sectional view thereof.

Fig. 3 is a similar view to Figure 2 showing the device in the set position, and Fig. 4 is a side elevation of a form of my device particularly applicable for trolling.

Like characters of reference indicate corresponding parts in the different views.

1 is a casing of preferably oval shape. 2 is a cross spindle extending intermediately of the same. 3 is an inverted U-shaped wire loop freely mounted on the spindle 2. 4 are oppositely disposed springs, one end of each spring having a hooked end 5 adapted to engage one of the legs of the inverted U-shaped loop intermediately of the length of the same, the other ends 6 of the springs being extended to engage the back of the casing 1, said springs being of spiral shape and being freely mounted on the spindle 2.

7 is an eye at the top of the inverted U-shaped loop. 8 is a catch hinged to the back of the casing 1 and extending in a forward direction therethrough, said catch being provided with the eye 9 at its free end and also with serrations 10. 11 is a plate hinged to the casing 1.

12 is a hole in the back of the casing between the catch 8 and the plate 11. 13 is a hole in the back of the casing between the catch 8 and the spindle 2. 14 is a portion of the fishing line adapted to be connected to the fishing rod, the lower end of the line 14 being provided with a swivel 15 by means of which it is connected to the upper end of the casing.

16 is a lower portion of the fishing line provided at its lower end with a suitable hook 17, the upper end of the line 16 extending forwardly through the hole 12 in the casing, up through the eye 7 in the inverted U-shaped loop, down through the hole 12 in a rearward direction and up through the hole 13 in a forward direction, the upper end being secured to the eye 9 of the catch.

In the form of device shown in Figure 4, 18 are oppositely disposed vanes suitably secured to the side of the casing 1 and 19 is a swivel attachment inserted in the line 16. In this form the casing is adapted to be rotated when trolling by the vanes 18 and thus take the place of the ordinary spinner or trolling spoon.

The operation of the device is as follows.

Assuming that the inverted loop 3 has been turned into the set position shown in Figure 3 wherein it is held in position by the plate 11 extending over the same and engaging the serrations 10 of the catch 8.

The line is now lowered into the water and when a fish bites the hook 17 the tension on the line will cause the catch 8 to be released from the plate 11 and thus permit the spring-held U-shaped loop to snap back into the position shown in Figure 1. When this occurs the line 16 will be drawn up into its initial position shown in either Figure 1 or Figure 2 and consequently will be shortened to a considerable extent. This is obvious by comparing the line shown in Figure 3 with that shown in Figure 2. When this occurs it will be seen that it will cause the hook 17 to be jerked up suddenly thus automatically hooking the fish.

The above action is similar to a person using the rod suddenly jerking it up a certain extent when he feels a bite on the line, but my device does this automatically.

From the above description it will be seen that I have constructed a simple and effective device for automatically hooking fish which will be exceedingly cheap to manufacture. The device while described above as being used in connection with a rod can be used quite as effectively for trolling or for use with night lines.

What I claim as my invention is:

1. In a device for automatically hooking fish, a casing having a cross spindle mounted therein intermediately of the length thereof, a loop member freely mounted on the spindle, springs on the spindle normally retaining the loop member in the inoperative position, said loop member having an eye formed on its free end, means for connecting the upper portion of the fishing line to the top of the casing, a hook, a portion of fishing line connected thereto, a catch hinged to the casing below the spindle, a plate hinged to the casing below the catch, said casing having holes in the back thereof situated between the catch and the spindle and between the spindle and the plate respectively, said catch engaging the free end of said plate for holding the loop member in the set position and the said lower portion of the line extending upwardly through the lower hole in the casing, up through the eye in the loop member, down through the lower hole in the casing in a rearward direction, up through the upper hole in the casing in a forward direction and the upper end of said lower portion of the line being connected to said catch.

2. In a device for automatically hooking fish, a casing having a cross spindle mounted therein intermediately of the length thereof, a loop member freely mounted on the spindle, springs on the spindle normally retaining the loop member in the inoperative position, said loop member having an eye formed on its free end, means for connecting the upper portion of the fishing line to the top of the casing, a hook, a portion of fishing line connected thereto, a catch hinged to the casing below the spindle, a plate hinged to the casing below the catch, said casing having holes in the back thereof situated between the catch and the spindle and between the spindle and the plate respectively, said catch engaging the free end of said plate for holding the loop member in the set position and the said lower portion of the line extending upwardly through the lower hole in the casing, up through the eye in the loop member, down through the lower hole in the casing in a rearward direction, up through the upper hole in the casing in a forward direction and the upper end of said lower portion of the line being connected to said catch and oppositely disposed vanes on the sides of the casing for causing the same to rotate.

3. In a device for automatically hooking fish, a casing having a cross spindle mounted therein intermediately of the length thereof, a loop member freely mounted on the spindle, springs on the spindle normally retaining the loop member in the inoperative position, said loop member having an eye formed on its free end, means for connecting the upper portion of the fishing line to the top of the casing, a hook, a portion of fishing line connected thereto, releasable means on the casing for holding the loop member in the set position, said casing having upper and lower holes through the back thereof, the portion of the line attached to the hook extending upwardly and forwardly through the lower hole in the casing, up through the eye in the loop member and downwardly through the lower hole in a rearward direction, and thence forwardly through the upper hole in the casing, its end being secured to the releasable means.

4. In a device for automatically hooking fish, a casing having a cross spindle mounted therein intermediately of the length thereof, a loop member freely mounted on the spindle, springs on the spindle normally retaining the loop member in the inoperative position, said loop member having an eye formed on its free end, means for connecting the upper portion of the fishing line to the top of the casing, a hook, a portion of fishing line connected thereto, releasable means on the casing for holding the loop member in the set position, said casing having upper and lower holes through the back thereof, the portion of the line attached to the hook extending upwardly and forwardly through the lower hole in the casing, up through the eye in the loop member and downwardly through the lower hole in a rearward direction, and thence forwardly through the upper hole in the casing, its end being secured to the releasable means and oppositely disposed vanes for rotating the casing.

JOHN GEORGE PENNELL.